United States Patent [19]

Ritchie et al.

[11] Patent Number: 4,977,013

[45] Date of Patent: Dec. 11, 1990

[54] TRANPARENT CONDUCTIVE COATINGS

[75] Inventors: Ian T. Ritchie, Los Angeles; Wilfred C. Kittler, Thousand Oaks, both of Calif.

[73] Assignee: Andus Corporation, Canoga Park, Calif.

[21] Appl. No.: 202,763

[22] Filed: Jun. 3, 1988

[51] Int. Cl.$^5$ ................................................ B32B 7/02
[52] U.S. Cl. .................................................... 428/212
[58] Field of Search ............... 428/688, 689, 697, 699, 428/701, 702, 938, 212, 336, 480, 432, 428, 426

[56] References Cited

U.S. PATENT DOCUMENTS

| | | |
|---|---|---|
| 3,565,807 | 0/1971 | Siverisen et al. |
| 3,698,946 | 0/1972 | Kaspaul et al. |
| 3,865,301 | 0/1975 | Pothier et al. |
| 3,922,452 | 0/1975 | Forker et al. |
| 3,936,580 | 0/1976 | Ward et al. |
| 3,941,968 | 0/1976 | Macmaster et al. |
| 4,057,670 | 0/1977 | Scheidler. |
| 4,201,649 | 0/1980 | Gillery. |
| 4,255,474 | 3/1981 | Smith, Jr. ............................ 428/212 |
| 4,266,108 | 0/1981 | Anderson et al. |
| 4,291,947 | 0/1981 | Cirkler et al. ....................... 350/336 |
| 4,345,000 | 0/1982 | Kawazoe et al. |
| 4,450,201 | 5/1984 | Brill et al. .......................... 428/336 |
| 4,689,458 | 0/1987 | Levendusky et al. |
| 4,710,433 | 12/1987 | Rowe et al. ......................... 428/428 |
| 4,737,018 | 0/1988 | Iwashita et al. ..................... 350/336 |

FOREIGN PATENT DOCUMENTS

| | | |
|---|---|---|
| 2116590 | of 0000 | United Kingdom. |
| 2132229 | of 0000 | United Kingdom. |
| 2823630 | of 1979 | United Kingdom. |
| 2121075 | of 1983 | United Kingdom. |

OTHER PUBLICATIONS

Howson et al., Proc. SPIE 428, 16 (1983).
Chopra et al., Thin film Solids 102, pp. 1, 19 (1983).
Hamberg et al., Applied Optics 22, 609 (1983).
Chen et al., Appl. Phys. Lett. 43, 901 (1983).

Primary Examiner—Thurman K. Page
Assistant Examiner—Archene A. Turner
Attorney, Agent, or Firm—Yuan Chao; Edith A. Rice; Herbert Burkard

[57] ABSTRACT

An article having a transparent conductive coating having predetermined interference reflectance and transmission properties substantially independent of its conductivity, comprising:
(a) a substrate having a refractive index $n_0$ and
(b) a coating disposed over at least a portion of the substrate and consisting of:
   (i) at least one transparent dielectric layer having a refractive index $n_1$ different from $n_0$; and
   (ii) at least one transparent conductive layer having a refractive index substantially equal to $n_1$, at least one of which has a thickness sufficient to provide a desired conductivity;

the coating having a thickness such that it has predetermined interference reflectance and transmission properties substantially independent of its conductivity.

47 Claims, 5 Drawing Sheets

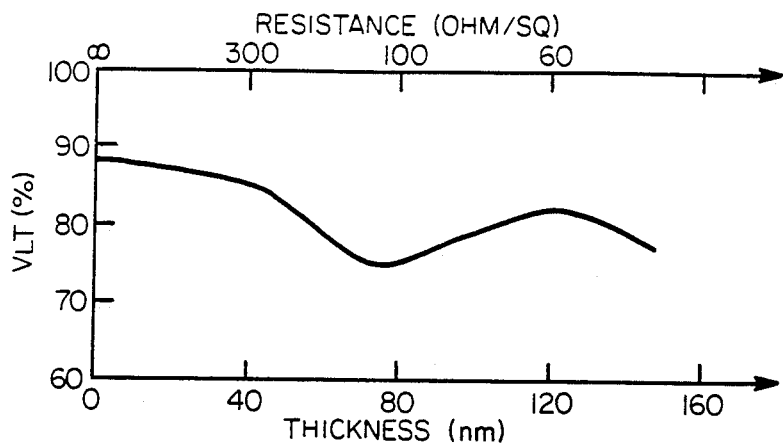
FIG_1
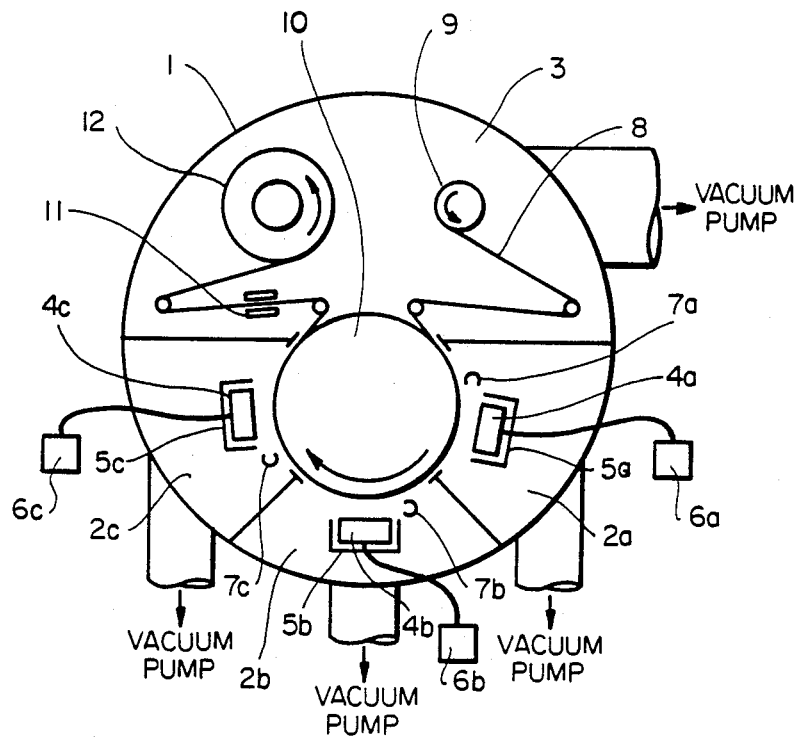
FIG_2

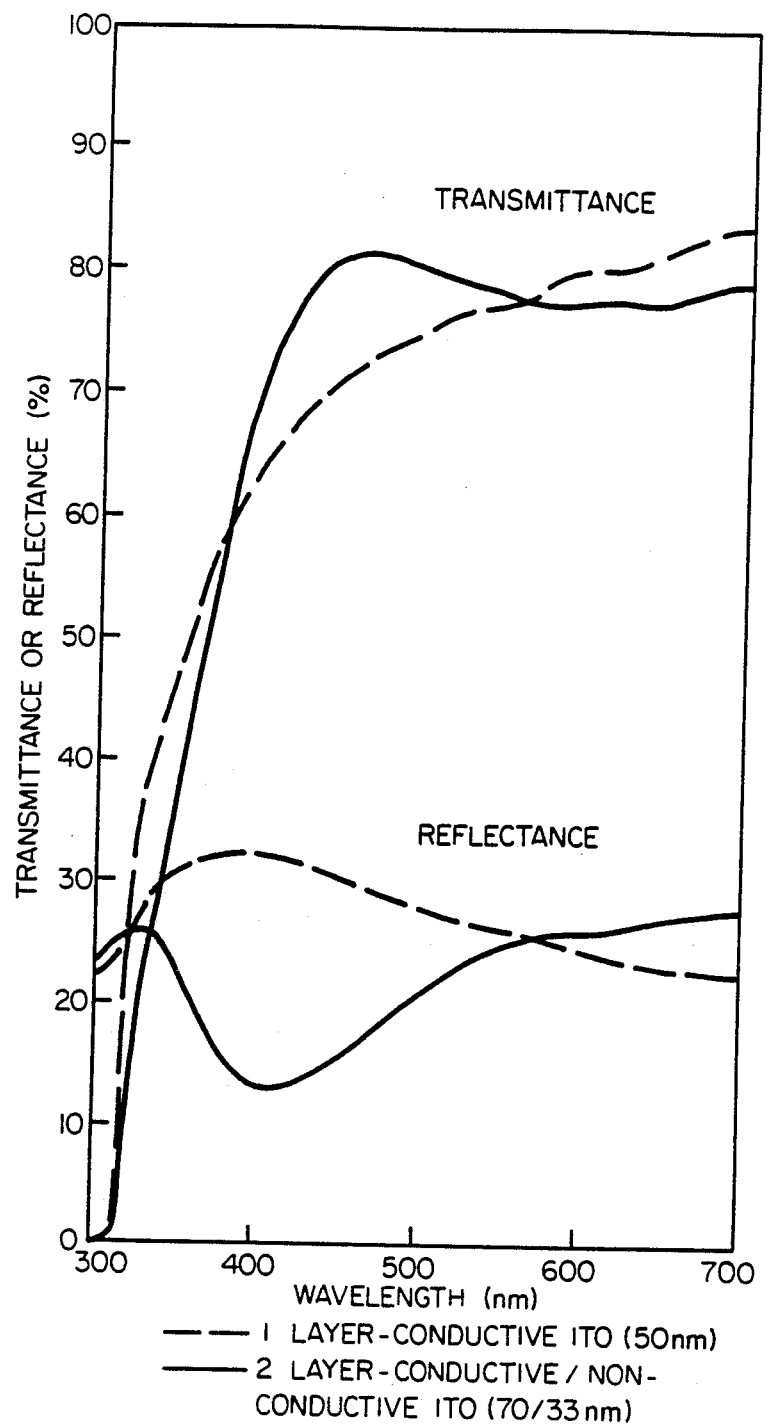
FIG_3

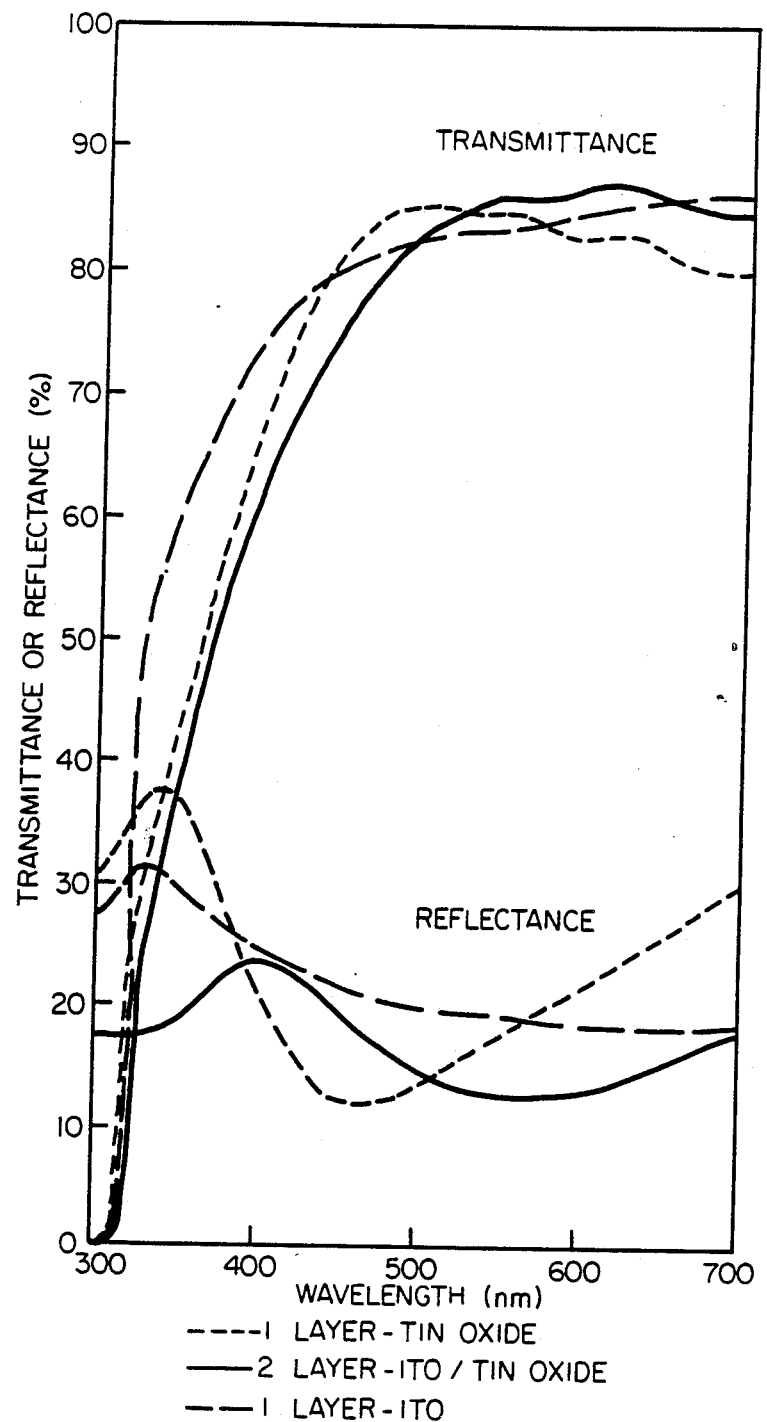
FIG_4

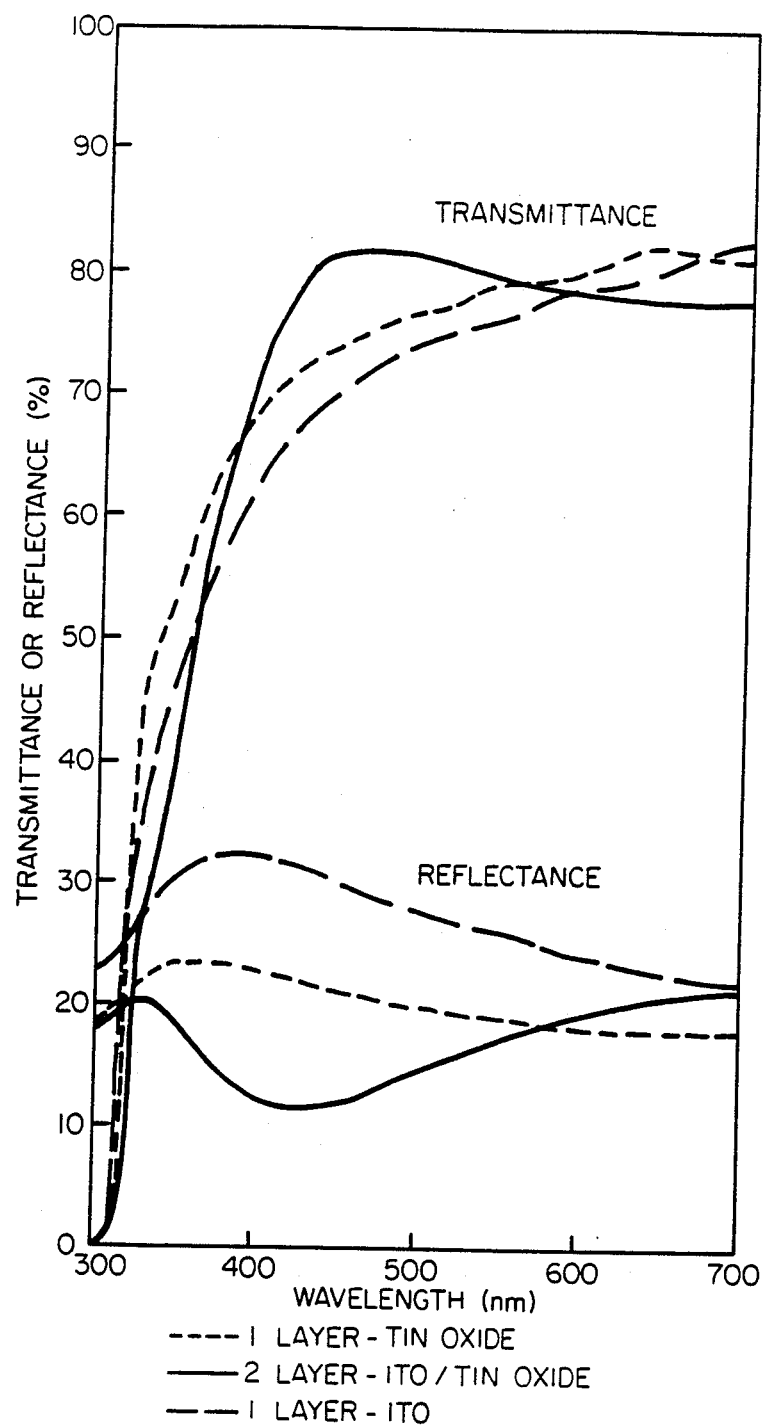
FIG_5

TRANSPARENT CONDUCTIVE COATINGS

BACKGROUND OF THE INVENTION

This invention relates to transparent conductive coatings and methods therefor.

Thin coatings of transparent conductive materials (hereinafter TC materials) deposited on a non-conductive substrate have numerous applications ("conductive", "conductivity", etc., understood to refer to electrical conductivity). An important application is as a transparent electrode in a liquid crystal, touch-sensitive, or other visual display. Common TC materials include indium oxide and indium tin oxide (ITO). ITO is commonly used with tin as the minor component, in indium/tin weight ratios such as 95/5, 90/10 or 80/20.

If a TC material of constant resistivity is deposited (resistivity being dependent on the deposition method and conditions), the resistance of a coating of the TC material is approximately inversely proportional to the coating thickness, according to equation (I):

$$\text{Resistance} = (\text{Resistivity})/(\text{Thickness}) \quad (I)$$

In practice, for a thin coating, by which is meant a coating less than a few hundred Angstroms thick, there can be deviations from this relationship, because of surface effects at both the coating/substrate and coating/air interfaces which affect its resistance. As a coating of TC material is made thinner and thinner, its resistance increases, both due to the decreased thickness and to the magnified relative importance of surface effects.

Conversely, if a TC coating is made thicker in order to obtain decreased resistance, its light transmittance decreases, due to two effects. Firstly, there is the absorption inherently present in any material, even in a nominally transparent material such as ITO. ITO has significant absorption of blue light, as its "band-gap" is at about 3.5 eV. This absorption can be particularly high when ITO is deposited by a low temperature process, as is necessary when coating films made of polymers such as poly(ethylene terephthalate) (PET) or other polyester.

Secondly, optical interference effects become pronounced as thickness increases, becoming noticeable for ITO coatings at thicknesses greater than several hundred Angstroms. When a material with a relatively high refractive index such as ITO is deposited onto a substrate with a lower refractive index such as PET, optical interference will occur between the reflections from the coating/air and coating/substrate interfaces, according to equation (II):

$$nd = ml/4 \quad (II)$$

where n is the refractive index of the coating, d is the coating thickness, l is the wavelength of light, and m is an integer. This interference results in a reflectance maximum (and a transmission minimum) when m is an odd integer (1,3,5 ...) and a reflectance minimum (and transmission maximum) when m is an even integer (2,4,6 ...). If the refractive index of the coating is less than that of the substrate, the selection rules are reversed—that is, reflectance minima occur when m is an odd integer and maxima occur when m is an even integer. As the thickness changes, the wavelengths of the minima and maxima change and hence the optical characteristics of the coating. For example, for a coating of ITO (refractive index about 2.0) 150 nm thick on PET (refractive index about 1.65), there is a visible wavelength transmission maximum at 600 nm (m=2, the maxima corresponding to other m's being outside the visible spectrum (400-700 nm)) and a minimum at 400 nm (m=3, the other minima being outside the visible spectrum). If the thickness is increased to 170 nm, the visible spectrum maximum and minimum shift to 680 and 453 nm, respectively. As a result, the visible light transmittance (VLT, the light transmittance averaged over 400-700 nm and weighted to the human eye's response) of ITO coatings on PET vary with thickness.

The aforementioned effects are particularly noticeable with coatings which have resistances of about 100 to about 200 ohm/sq. These coatings are thick enough (typically about 50-100 nm, depending on the deposition technique) to have significant absorption of blue light and are also thick enough to have an interference transmission minimum at or near the blue part of the spectrum. Consequently they appear unpleasantly brown in transmission to the human eye. These effects are exacerbated by absorption or scattering in the substrate, which is usually most pronounced for blue light.

Additionally, although high-resistance and high VLT coatings can be obtained by making the coating thinner, such coatings are very fragile and prone to several problems. They have poor abrasion resistance. They are difficult to deposit with uniform properties as the state of the substrate plays a considerable role in determining the quality of a coating, a non-uniform substrate producing a coating with non-uniform properties. Thin coatings impede water vapor and other gas permeation only slightly, whereas thicker coatings can be quite effective as vapor transmission barriers. The barrier properties of such films are discussed in Stern, GB No. 2,132,229 A (1984). As a coating is deposited on the substrate, the first several atomic layers do not nucleate evenly on it, causing poor and non-uniform properties in these first atomic layers. The top 3-5 nm of a coating will passivate in the atmosphere, forming a non-conducting oxide. If the thickness of the first atomic layers or the passivation layer is significant compared to the total coating thickness, then it will dramatically affect the overall properties of the coating.

In some applications, it is only required that the conductivity of a coating be less than a particular value, in which case the coating can simply be made sufficiently thick to lower the resistance below that value and to shift interference effects away from the wavelengths where an undesirable color effect is produced. However, in many other applications, a coating having specified resistance and optical or color characteristics is required. Then, the coating cannot be simply made thicker, as the resistance will then become unacceptably low. Conversely, at the thickness at which the desired resistance is obtained, the interference effects may be such as to make the coating's optical or color characteristics unacceptable.

It is known that the resistivity of TC materials such as ITO increases as the amount of tin present increases. See, e.g., Howson et al, Proc. SPIE 428, 14 (1983) and Chopra et al., Thin Solid Films 102, 1 (1983). This characteristic can be exploited to produce a high tin content ITO coating with a given resistance which is thicker than a lower tin content ITO coating of the same resistance. The thickness can be selected so as to shift the interference effects to a different wavelength and produce a coating with the desired optical or color characteristics. The disadvantage of this technique is that if a number of coatings is desired, all with the same thicknesses but different resistances, then the indium to tin ratio in the ITO must be varied for each coating. If the coatings are produced by a vacuum deposition technique such as sputtering, this is difficult to do, as a different sputtering target must be fabricated for every composition and resistance value.

Our invention provides a transparent conductive coating whose conductivity can be conveniently controlled but yet without compromising its optical properties.

SUMMARY OF THE INVENTION

According to one aspect of our invention, there is provided an article having a transparent conductive coating having predetermined interference reflectance and transmission properties substantially independent of its conductivity, comprising:
 (a) a substrate having a refractive index $n_o$ and
 (b) a coating disposed over at least a portion of the substrate and consisting of:
  (i) at least one transparent dielectric layer having a refractive index $n_1$ different from $n_0$; and
  (ii) at least one transparent conductive layer having a refractive index substantially equal to $n_1$, at least one of which has a thickness sufficient to provide a desired conductivity;
the coating having a thickness such that it has predetermined interference reflectance and transmission properties substantially independent of its conductivity.

According to another aspect of our invention, the coating has an interference reflectance minimum at a wavelength 1 between about 350 and about 650 nm according to the equation $$1 = 4n_1D/m$$

where D is the thickness of said coating and m is 2 in the event $n_1$ is greater than $n_0$ and 1 or 3 in the event $n_1$ is less than $n_0$.

According to yet another aspect of our invention, the coating has a thickness between about 50 and about 150 nm.

According to yet another aspect of our invention, the coating is transparent to infra-red radiation and has an interference reflectance minimum at a predetermined wavelength in the infra-red spectrum.

Our invention further provides a method of making an article having a transparent conductive coating having predetermined interference reflectance and transmission properties substantially independent of its conductivity, comprising the steps of:
 (a) providing a substrate having a refractive index $n_o$ and
 (b) depositing, over at least a portion of the substrate, a coating consisting of:
  (i) at least one transparent dielectric layer having a refractive index $n_1$ different from $n_0$; and
  (ii) at least one transparent conductive layer having a refractive index substantially equal to $n_1$, at least one of which has a thickness sufficient to provide a desired conductivity;
the coating having a thickness such that it has predetermined interference reflectance and transmittance properties substantially independent of its conductivity.

Our invention further provides a method of making at least two articles, each article having a transparent conductive coating, the coatings having different conductivities but substantially the same interference reflectance and transmission properties, comprising the steps of:
 (a) providing a substrate for each article; and
 (b) depositing, over at least a portion of each substrate, a coating consisting of:
  (i) at least one transparent dielectric layer having a refractive index $n_1$ different from the refractive index of the respective substrate; and
  (ii) at least one transparent conductive layer having a refractive index substantially equal to $n_1$, at least one of which has a thickness sufficient to provide a predetermined conductivity;
each coating having the same thickness and a different predetermined conductivity.

BRIEF DESCRIPTION OF THE DRAWINGS

FIG. 1 depicts the thickness dependence of the VLT of a representative prior art single layer ITO coating on PET.

FIG. 2 depicts schematically a three chamber sputter roll coater which can be used to deposit the coatings of this invention.

FIG. 3 compares the transmittance and reflectance properties of a PET film coated according to this invention with those of a PET film not coated according to this invention.

FIG. 4 compares the transmittance and reflectance properties of a PET film coated according to this invention with those of PET films not coated according to this invention.

FIG. 5 compares the reflectance and transmittance properties of a PET film coated according to this invention with those of PET films not coated according to this invention.

DESCRIPTION OF PREFERRED EMBODIMENTS

As discussed hereinabove, the optical characteristics of a conventional ITO coating on PET (or other substrate) are dependent on its thickness. This is illustrated in FIG. 1, which shows the variation in the VLT of a conventional ITO coated PET film with coating thickness. (For convenience, the VLT of the coating and substrate together is measured, although the shape of the VLT v. thickness curve for the coating alone is substantially similar.) This variability makes it difficult to prepare coatings having different resistances but the same optical characteristics.

Our invention provides multi-layer coatings which can readily be made to have different resistances as desired but optical characteristics, in particular interference transmittance and reflectance minima and maxima, which are substantially independent of its resistance. Also, the coatings of our invention, being more robust than prior art coatings, can withstand more physical abuse and have superior barrier properties. Our coatings consist of at least one transparent conductive layer of sufficient thickness to provide the desired electrical resistance and at least one transparent nonconductive (dielectric) layer. By a nonconductive or dielectric layer, we mean that its resistance is much greater than that of the conductive layer. The refractive indices of the two layers are substantially equal, by which is meant the refractive indices of the layers differ by less than 0.2. More preferably they differ by less than 0.1.

Because of the equality of refractive indices, interference effects—and hence, optical properties—are determined by the combined thicknesses of the layers. The combined thicknesses are selected to shift the interference maxima and minima into a part of the spectrum that produces a coating with the desired optical properties.

In a preferred embodiment, the coating consists of one conductive and one nonconductive layer, with the latter layer being positioned between the substrate and the conductive layer. Within this combined thickness, the thickness of the conductive layer can be varied at will to produce the desired electrical resistance. For applications in which a visible wavelength color-neutral appearance is important, the combined thickness is preferably between about 50 and about 200 nm. More preferably, the total thickness is less than about 150 nm. In such instances, the thickness of the conductive layer preferably ranges from about 10 nm up to substantially the total thickness, that is, to within about 10 nm thereof. Where transparency at other wavelengths is desired, for example in applications involving infra-red lasers which commonly operate at infra-red wavelengths such as 0.83, 1.06, or 10.6 microns, the total thickness may be adjusted according to equation (II) to maximize transparency at that wavelength. It will be apparent from equation (II) that for infra-red transmissive applications the combined thickness will be substantially thicker than for visible wavelength transmissive applications.

Our invention is particularly suited for making a series of transparent conductive coatings of different resistances but having the same interference reflectance and transmission properties. The thickness of the conductive layer in each coating is varied according to the desired resistance, and the thickness of the nonconductive layer is correspondingly varied so that the overall thickness of the combined layers is substantially the same for each coating in the series, causing the coatings to have substantially the same interference properties.

For the practice of our invention it is not necessary know absolutely the refractive indices of the conductive and nonconductive layers, provided the indices are substantially the same. It can be seen from equation (II) that interference effects are governed by the "optical thickness" nd (the product of the refractive index and the thickness), a parameter which can readily be measured spectrophotometrically without knowledge or measurement of the refractive indices. If one makes a series of coatings of varying thicknesses and determines their reflectance and transmittance spectra, one can deduce the values of m in Equation (II) for particular minima or maxima, and, thence, the optical thickness nd.

A preferred material for the conductive layer is indium tin oxide (ITO), but any one of the wide band-gap semiconducting oxides can be used, such as indium oxide, tin oxide, zinc oxide, cadmium oxide, cadmium stannate, and so forth. The nonconductive layer can be made from any of the aforemention materials, in their nonconductive form. Those skilled in the art will appreciate that the conductivities of materials such as indium oxide, tin oxide, etc., vary with the extent of oxidation, the fully oxidized forms being non-conductive. Also, any other transparent nonconductive material with a refractive index of about 2.0, such as titanium or zirconium oxide, can be used with the aforementioned conductive materials, which generally have a refractive index of about 2.0, with some variability depending on deposition technique.

The substrate can be any material upon which it is desired to deposit a transparent conductive coating, for example polymer sheets or film made from poly(ethylene terephthalate) (PET), other polyesters, polycarbonates, acrylic polymer, polyimides, fluoropolymers, cellulose triacetate, etc.; glass; and ceramic materials. Preferably the substrate is a visible light transparent or translucent polymeric film or sheet, for example PET film or sheet. The substrate may contain additives, such as UV stabilizers or absorbers, antioxidants, and the like. However, our invention is also utilizable with an opaque substrate, such as white PET (filled with titanium oxide or other opacifying agent) or ceramic, where color control in the reflected light is important. For applications in which infra-red transparency is desired, the substrate may be made of an infra-red transparent material, such as zinc selenide, germanium, or silicon. Where appropriate, the substrate may be surface-treated, for example by deposition of a primer layer to improve the adhesion of the coating layers. The word substrate, as used herein, includes primed or otherwise surface treated substrates.

Interference transmittance and reflectance problems normally arise where the refractive index of the substrate is different from that of the coating. Thus, our invention is specially advantageous where the refractive index differential between the two is greater than 0.2, more preferably greater than 0.3. For example, for a coating having a refractive index of about 2.0, as in the case of ITO, the refractive index of the substrate is preferably less than 1.8, or greater than 2.2.

A preferred method for depositing the coatings of this invention is sputtering, in particular magnetron sputtering. The composition of the deposited coating can be controlled by reactive sputtering techniques, as is well known in the art. Other techniques suitable for the deposition of the thin films of this invention can also be used, for example spray pyrolysis, chemical vapor deposition, ion plating, vacuum evaporation, and the like.

Where the nonconductive layer is sandwiched between the substrate and the conductive layer, the latter is available to serve as an electrode and establish good electrical contact with another material, with a minimum of contact resistance. Also, the resistivity of the conductive layer can then be more precisely controlled, as it will be deposited on a clean surface of known morphology, and will not be susceptible to variations or imperfections on the substrate surface.

This embodiment is particularly useful for those applications in which it is desired to form transparent electrode patterns, such as in liquid crystal displays or transparent membrane switches. If the conductive and nonconductive layer have different properties, for example different ease of dissolution in a particular solvent, the conductive layer can be selectively etched using an etchant which is a solvent for it, but not for the nonconductive layer. A preferred selective etching method is disclosed in copending, commonly assigned application of Stoddard, Ser. No. 06/915,355, filed Oct. 6, 1986, the disclosure of which is incorporated herein by reference. The nonconductive layer will be left covering the underlying substrate and protecting it by serving as a barrier layer, abrasion shield, etc. For example, if the conductive layer is made from ITO and the nonconductive layer is made from tin oxide, the ITO can be etched with 10% sulfuric acid without affecting the tin oxide. Another advantage of this embodiment is that the difference between the optical properties of the etched and unetched areas can be minimized by judicious selection of the thicknesses of the conductive and nonconductive layers, enabling the preparation of largely invisible electrode elements.

Conversely, if both the conductive and the non-conductive layers are made of the same material, or of different materials having the same etchability properties, then both can be etched with the same etchant. For example, if the conductive layer is made from conductive ITO and the nonconductive layer is made from nonconductive ITO, then both can be etched away with sulfuric acid.

In another embodiment of our invention, the positions of the conductive and nonconductive layers are reversed—that is, the conductive layer is sandwiched between the nonconductive layer and the substrate. In this embodiment, the conductive layer is more protected, but its contact resistance will be higher. However, increased contact resistance is not a disadvantage in field effect devices such as twisted nematic liquid crystal displays or in encapsulated liquid crystal displays, such as disclosed by Fergason in U.S. Pat. No. 4,435,047 (1984).

While heretofore our invention has primarily been described in terms of a two layer coating, one layer being conductive and the other nonconductive, as a manner of convenience and to facilitate understanding thereof, it is not limited to two-layer embodiments. In yet another embodiment, more than two layers are used, while keeping the total thickness of the combined layers controlled as described hereinbefore. For example, it may be desirable to deposit onto the substrate, in succession, a first nonconductive layer, conductive layer, and a second nonconductive layer. Then, the conductive layer is doubly advantaged by being deposited onto the first nonconductive layer's clean and morphologically controllable surface and by being environmentally protected by the second nonconductive layer. Those skilled in the art will understand that embodiments with even more layers, for example two conductive and two nonconductive ones, are possible, applying the teachings and principles described hereinabove. They will further understand that, in such instances, it is not necessary that all conductive (or all nonconductive) layers have the same composition, provided the aforementioned refractive index characteristics are satisfied.

The coatings of our invention may, where appropriate, be overcoated with protective overcoats, adhesives, and the like, to suit a particular end use.

The practice of our invention can be more readily understood by reference to the following examples, which are provided by way of illustration and not limitation. VLT's were measured on a Photodyne Model 99xL Photometer/Densitometer (Photodyne, Inc., Newbury Park, Calif.), equipped with a light source (usually a CIE standard illuminant), substrate fixturing with focussing and collimating optics, filter to match the human eye's response, detector, display, and appropriate electronics. Transmittance and reflectance spectra were measured on a Cary 14 spectrophotometer. Surface resistance (ohms/sq) was measured by taking a square of coated substrate and making contact along the lengths of two parallel sides of the square. These contacts were then attached to a commercial ohmmeter. Electrical contact can be conveniently made with strips of copper sheet or conductive elastomer (preferable if the copper damages the coating) or conductive inks or epoxies.

EXAMPLE 1

A three-chamber sputter coater was used to deposit the coating of this example. This sputter coater is shown schematically in FIG. 2. Sputter coater 1 has three sputtering chambers 2a-c and an unwind/rewind chamber 3, each having a vacuum outlet. Chambers 2a-c have sputter sources 4a-c, having shields 5a-c to control the sputter beam and powered by power sources 6a-c, respectively, and further having controllable gas inlets 7a-c, again respectively, to make them suitable for reactive sputtering. Film 8, which is to be coated, is unwound from payout roll 9 and carried by chill drum 10 through each of chambers 2a-c. During its passage through chambers 2a-c, film 8 may be coated with successive layers of the same coating material, or layers of different coating materials, and so forth. Monitors 11 provide information on the resistance, optical transmission, and/or other properties of the coating. The coated film is wound onto takeup roll 12. Reactive sputtering is further described in Kittler et al., Proc. SPIE 325, 61 (1982) and Howson et al., Proc. SPIE 324, 17 (1982), the disclosures of which are incorporated herein by reference.

Using this sputter coater, a roll of optical grade PET was coated first with a layer of non-conductive ITO 33 nm thick. A layer of conductive ITO 70 nm thick (indium/tin weight ratio 90/10 in this and other examples) was then deposited onto the non-conductive ITO layer, to produce a coating with a total thickness of 103 nm. As the refractive index of ITO is about 2.0, the interference reflectance minimum (and corresponding transmission maximum) is at about 410 nm. A transmission maximum at this wavelength offsets substantially the blue absorption characteristics of the ITO, resulting in a coating which has approximately constant transmission throughout the visible spectrum (400–700 nm) and therefore a neutral colored appearance. The transmission and reflectance properties of this coated PET are provided in FIG. 3 (full lines). The coating resistance was measured as about 104 ohm/sq.

EXAMPLE 2

In this comparative example not according to our invention, optical grade PET was coated with conductive ITO using the same apparatus of the preceding example. The thickness of the coating was adjusted, by varying the speed at which the film passed by the coating stations, so that the resistance of the coating was approximately the same as in Example 1. In fact, a coating with a resistance of 102 ohm/sq was obtained. Its thickness was about 50 nm.

The transmission and reflectance characteristics of this coated PET are also shown in FIG. 3 (dashed lines). The transmission varies considerably throughout the visible spectrum and the coating appears brown in transmission. Additionally, the reflectance of the coating is considerably higher than that of the coating of Example 1, although the VLT's of both coatings was 78%. Further, this second coating, being thinner, would be less robust and resistant to abrasion and a poorer barrier to water vapor and oxygen.

EXAMPLE 3

In this example, a sputter coater with only two coating chambers but otherwise similar to the one of Examples 1 and 2 was used. Optical grade PET was coated first with tin oxide (non-conductive) to a thickness of 115 nm. The transmission and reflectance spectra of this single coated PET are shown in FIG. 4 (dotted lines). A conductive ITO layer 25 nm thick was deposited onto the tin oxide layer, to give PET film coated with a two-layer coating 140 nm thick, the spectra of which are shown in FIG. 4 (solid lines). This coating had a VLT of 85% and a resistance of 55 kilohm/sq.

For comparison, a 25 nm coating of conductive ITO was deposited directly onto the PET. Its VLT was 84% and its resistance was 56 kilohm/sq. The corresponding transmission and reflectance spectra are shown in FIG. 4 (dashed lines).

While both coatings have similar resistances and VLT's, the double layer coating is much more robust, as shown by the following comparative abrasion test. A paper towel ("Kaydry", from Kimberley-Clark), weighted with a 2×2 inch square 4 pound mass, was rubbed across the surface of the coating, the coated PET film being affixed to a solid surface with double sided adhesive tape. The results are provided in Table I.

TABLE I

| | Resistance (kilohm/sq) | |
|---|---|---|
| No. of passes with paper towel | Two layer coating (140 nm) | One layer coating (25 nm) |
| 0 | 55 | 59 |
| 1 | 30 | 70 |
| 2 | 25 | 80 |
| 3 | 21 | 96 |
| 10 | 14 | 200 |

These results show that the single layer coating is much less robust than the double layer coating. The reason for the drop in the resistance of the double layer is not clear. It may be due to the removal of the non-conductive passivation layer from the surface by abrasion. It is interesting to note that the non-conductive layer unexpectedly improves abrasion resistance even though it is located underneath the conductive layer, rather than between the conductive layer and abrasive. While we do not wish to be bound by any theory, we believe that this effect is related to the deformation of the polymer substrate, which deformation tends to crack a thin layer. The thicker two layer coating deforms less and hence is sturdier.

The ITO in the two-layered tin oxide-ITO coating of this example can be conveniently and selectively etched while leaving tin oxide layer intact and protecting the underlying substrate, demonstratable as follows: When the two layered coating is immersed in 10% sulfuric acid (a fluid which dissolves ITO, but not tin oxide) at 20° C., the ITO layer was completely removed after 30 sec, but the tin oxide layer remained unaffected after 30 min immersion.

EXAMPLE 4

In the two chamber sputter roll coater of Example 3, optical grade PET was first coated with a layer of nonconductive tin oxide approximately 46 nm thick. The transmission and reflectance spectra are shown in FIG. 5 (dotted lines).

A conductive ITO coating approximately 60 nm thick was deposited on the tin oxide layer, to give a total coating thickness of about 106 nm. The combined coating had a reflectance minimum at about 425 nm, a VLT of 80%, and a resistance of 98 ohm/sq. Its spectra are shown in FIG. 5 (solid lines). For comparison, the spectra of the single layer conductive ITO coating (102 ohm/sq resistance) of Example 2 is also shown in FIG. 5 (dashed lines). The combined coating had a higher VLT, lower reflectance, and a more neutral transmitted color than the Example 2 coating, although the two had similar resistances.

The two layer coating was selectively etched by depositing a pattern of 10% sulfuric acid solution over selected portions for 4 min at 20° C. The ITO layer was etched off where it contacted the sulfuric acid, while the tin oxide underlayer remained unaffected even after 30 min immersion in this solution.

We claim:

1. An article having a transparent conductive coating having predetermined interference reflectance and transmission properties substantially independent of its conductivity, comprising:
   (a) a substrate having a refractive index $n_0$ and
   (b) a coating disposed over at least a portion of said substrate and consisting of:
      (i) at least one transparent dielectric layer having a refractive index $n_1$ different from $n_0$; and
      (ii) at least one transparent conductive layer having a refractive index substantially equal to $n_1$, at least one of which has a thickness sufficient to provide a desired conductivity;
   said coating having a thickness such that said coating has predetermined interference reflectance and transmission properties substantially independent of the conductivity of said coating.

2. An article according to claim 1, wherein said coating consists of one dielectric layer and one conductive layer, said dielectric layer being positioned between said substrate and said conductive layer.

3. An article according to claim 1, wherein said coating consists of one dielectric and one conductive layer, said conductive layer being positioned between said substrate and said dielectric layer.

4. An article according to claim 1, wherein said coating consists of a conductive layer sandwiched between two nonconductive layers.

5. An article according to claim 1, wherein said conductive layer is made of conductive indium tin oxide, tin oxide, zinc oxide, cadmium oxide, indium oxide, or cadmium stannate.

6. An article according to claim 1, wherein said conductive layer is made of conductive indium tin oxide.

7. An article according to claim 1, wherein said dielectric layer is made of nonconductive indium tin oxide, tin oxide, zinc oxide, cadmium oxide, indium oxide, or cadmium stannate; titanium oxide; or zirconium oxide.

8. An article according to claim 1, wherein said substrate is made of polyester, polycarbonate, acrylic polymer, polyimide, fluoropolymer, cellulose triacetate, glass, or ceramic.

9. An article according to claim 1, wherein said substrate is made of poly(ethylene terephthalate).

10. An article according to claim 1, wherein said coating is sputtered.

11. An article according to claim 1, wherein said conductive layer has been etched to form an electrode pattern.

12. An article having a transparent conductive coating, comprising:
(a) a substrate having a refractive index $n_o$ and
(b) a coating disposed over at least a portion of said substrate and consisting of:
(i) at least one transparent dielectric layer having a refractive index $n_1$ different from $n_0$; and
(ii) at least one transparent conductive layer having a refractive index substantially equal to $n_1$, at least of which has a thickness sufficient to provide a desired conductivity;

said coating having an interference reflectance minimum at a wavelength 1 between about 350 and about 650 nm according to the equation $$l = 4n_1 D/m$$

where D is the thickness of said coating and m is 2 in the event $n_1$ is greater than $n_0$ and 1 or 3 in the event $n_1$ is less than $n_0$.

13. An article according to claim 12, wherein said coating consists of one dielectric layer and one conductive layer, said dielectric layer being positioned between said substrate and said conductive layer.

14. An article according to claim 12, wherein said coating consists of one dielectric layer and one conductive layer, said conductive layer being positioned between said substrate and said dielectric layer.

15. An article according to claim 12, wherein said coating consists of a conductive layer sandwiched between two nonconductive layers.

16. An article according to claim 12, wherein said conductive layer is made of conductive indium tin oxide, tin oxide, zinc oxide, cadmium oxide, indium oxide, or cadmium stannate.

17. An article according to claim 12, wherein said conductive layer is made of conductive indium tin oxide.

18. An article according to claim 12, wherein said dielectric layer is made of nonconductive indium tin oxide, tin oxide, zinc oxide, cadmium oxide, indium oxide, or cadmium stannate; titanium oxide; or zirconium oxide.

19. An article according to claim 12, wherein said substrate is made of polyester, polycarbonate, acrylic polymer, polyimide, fluoropolymer, cellulose triacetate, glass, or ceramic.

20. An article according to claim 12, wherein said substrate is made of poly(ethylene terephthalate).

21. An article according to claim 12, wherein said coating is sputtered.

22. An article according to claim 12, wherein said conductive layer has been etched to form an electrode pattern.

23. An article having a transparent conductive coating, comprising:
(a) a substrate having a refractive index $n_o$ and
(b) a coating disposed over at least a portion of said substrate and consisting of:
(i) at least one transparent dielectric layer having a refractive index $n_1$ different from $n_0$; and
(ii) at least one transparent conductive layer having a refractive index substantially equal to $n_1$, at least one of which has a thickness sufficient to provide a desired conductivity;

the thickness of said coating being between about 50 and about 200 nm.

24. An article according to claim 23, wherein said coating consists of one dielectric layer and one conductive layer, said dielectric layer being positioned between said substrate and said conductive layer.

25. An article according to claim 23, wherein said coating consists of one dielectric and one conductive layer, said conductive layer being positioned between said substrate and said dielectric layer.

26. An article according to claim 23, wherein said coating consists of a conductive layer sandwiched between two nonconductive layers.

27. An article according to claim 23, wherein said conductive layer is made of conductive indium tin oxide, tin oxide, zinc oxide, cadmium oxide, indium oxide, or cadmium stannate.

28. An article according to claim 23, wherein said conductive layer is made of conductive indium tin oxide.

29. An article according to claim 23, wherein said dielectric layer is made of nonconductive indium tin oxide, tin oxide, zinc oxide, cadmium oxide, indium oxide, or cadmium stannate; titanium oxide; or zirconium oxide.

30. An article according to claim 23, wherein said substrate is made of polyester, polycarbonate, acrylic polymer, polyimide, fluoropolymer, cellulose triacetate, glass, or ceramic.

31. An article according to claim 23, wherein said substrate is made of poly(ethylene terephthalate).

32. An article according to claim 23, wherein said coating is sputtered.

33. An article according to claim 23, wherein said conductive layer has been etched to form an electrode pattern.

34. An article having a conductive coating which is substantially transparent to infra-red radiation at a predetermined wavelength, comprising:
(a) a substrate having a refractive index $n_0$ and
(b) a coating disposed over at least a portion of said substrate and consisting of:
(i) at least one infra-red transparent, dielectric layer having a refractive index $n_1$ different from $n_0$; and
(ii) at least one infra-red transparent, conductive layer having a refractive index substantially equal to $n_1$, at least one of which a thickness sufficient to provide a desired conductivity;

said coating having a thickness such that said coating has an interference reflectance minimum at a predetermined wavelength in the infra-red spectrum.

35. An article according to claim 34, wherein said coating consists of one dielectric layer and one conductive layer, said dielectric layer being positioned between said substrate and said conductive layer.

36. An article according to claim 34, wherein said coating consists of one dielectric layer and one conductive layer, said conductive layer being positioned between said substrate and said dielectric layer.

37. An article according to claim 34, wherein said coating consists of a conductive layer sandwiched between two nonconductive layers.

38. An article according to claim 34, wherein said conductive layer is made of conductive indium tin oxide, tin oxide, zinc oxide, cadmium oxide, indium oxide, or cadmium stannate.

39. An article according to claim 34, wherein said conductive layer is made of conductive indium tin oxide.

40. An article according to claim 34, wherein said dielectric layer is made of nonconductive indium tin oxide, tin oxide, zinc oxide, cadmium oxide, indium oxide, or cadmium stannate; titanium oxide; or zirconium oxide.

41. An article according to claim 34, wherein said substrate is made of zinc selenide, germanium, or silicon.

42. An article according to claim 34, wherein said coating is sputtered.

43. An article according to claim 34, wherein said conductive layer has been etched to form an electrode pattern.

44. An article having a transparent conductive coating, comprising:
(a) a substrate and
(b) a coating disposed over at least a portion of said substrate and consisting of:
  (i) a conductive indium tin oxide layer having a thickness sufficient to provide a desired conductivity; and
  (ii) a transparent dielectric layer having a refractive index substantially equal to that of said indium tin oxide layer and positioned between said substrate and said indium tin oxide layer;
the refractive index of said substrate being different from that of said indium tin oxide and dielectric layers; and the thickness of said coating being between about 50 and about 200 nm.

45. An article according to claim 44, wherein said dielectric layer is made of nonconductive indium tin oxide or tin oxide.

46. An article according to claim 44, wherein said substrate is made of poly(ethylene terephthalate).

47. An article according to claim 44, wherein said coating has a thickness between about 50 and about 150 nm.

* * * * *